Aug. 26, 1952  F. W. COFFING  2,608,432
DROP HOOK DEVICE
Filed Aug. 12, 1948
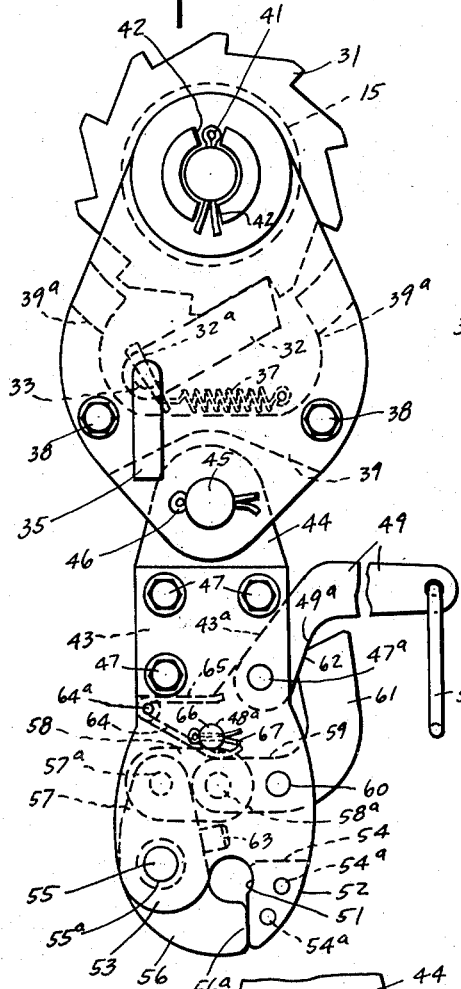
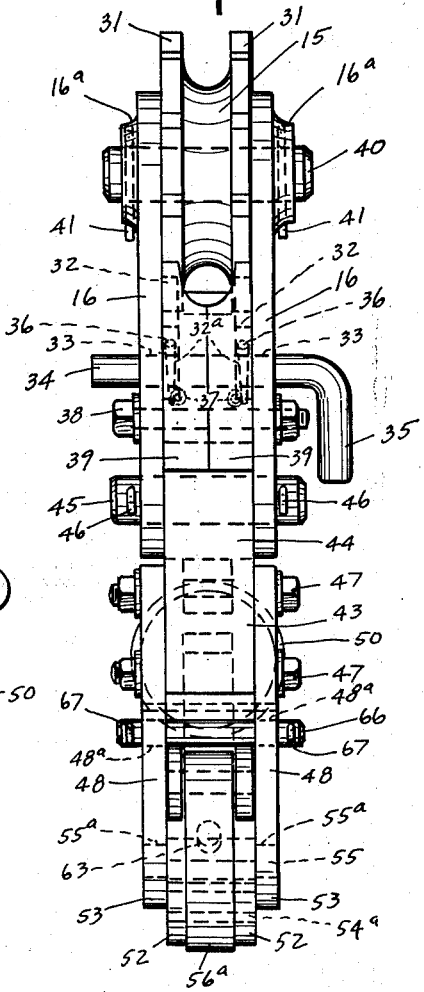
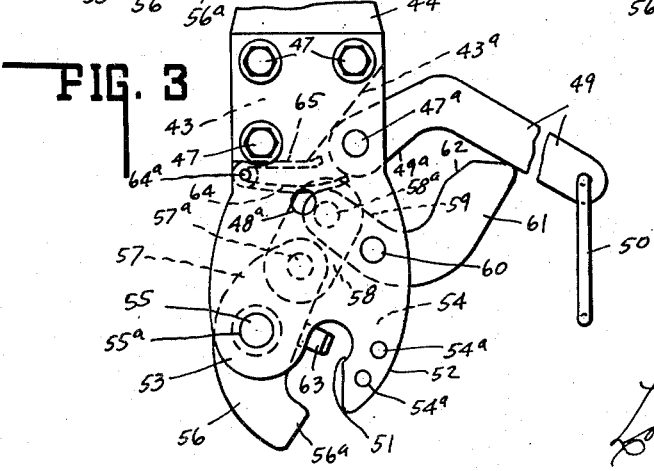
INVENTOR.
FREDRICK W. COFFING.
BY
Lockwood, Goldsmith & Galt.
ATTORNEYS.

Patented Aug. 26, 1952

2,608,432

UNITED STATES PATENT OFFICE 2,608,432

DROP HOOK DEVICE

Fredrick W. Coffing, Danville, Ill., assignor to Coffing Hoist Company, Danville, Ill., a corporation Application August 12, 1948, Serial No. 43,901

4 Claims. (Cl. 294—83)

This invention relates to a drop or quick release hook device.

One chief object of this invention is to provide a hook structure that is normally disposed in open or closed position and normally constrained to that position.

A corollary thereto is that the invention is of quick release type, the release being effected manually and from a remote position if desired.

Supplementary objectives are to have such device arranged to automatically initiate closing upon presentation to the open hook of a member to be held thereby, automatically complete the closing, and to permanently lock the hook in closed position to prevent accidental manual release thereof.

A second chief object of this invention is to provide a cable, chain or like support for same and provide means to adjustably associate the aforesaid with the hook portion whereby the aforesaid may be disposed in adjusted position and held in that position.

One chief feature of the invention resides in the toggle character of the hook actuating mechanism. Supplementary features reside in the instrumentalities provided to accomplish the corollary and supplementary objectives aforesaid.

A second chief feature resides in the pivotal (and if desired universal) joint connection of the hook to a combination pulley, pawl and ratchet structure arranged for cable, chain or like support purposes.

Other objects and features of the invention will be set forth more fully hereinafter.

The full nature of the invention will be understood from the accompanying drawings and the following description and claims:

In the drawings,

Fig. 1 is a side elevation of combination tension maintainer and releasable hook embodying the invention, the hook parts being shown in closed position.

Fig. 2 is an end elevation thereof.

Fig. 3 is a view similar to Fig. 1 and of the hook portion only and with parts shown in the open hook or released position.

In Figs. 1 and 2 of the drawings a pair of plates 16 having outer bosses 16a at their upper ends are apertured to take shaft or pin 40 upon which is mounted a combination pulley and ratchet having pulley portion 15 and side flanges in the form of ratchets 31. The bosses are notched at 42 to accommodate cotter keys 41 or the like to secure the shaft to the plates.

The plates at their other ends are spaced apart to form a chamber, the inner wall of which is defined by spacer 39. Bolts and nuts 38 clampingly secure the spacer and plates 16 together.

As shown, the spacer lugs 39 have two arms 39a extended upwardly to form with plates 16 chamber into which the aforesaid ratchets 31 project. The plates are apertured at 33 and rotatably disposed therein is shaft 34 with angularly and exteriorly disposed end 35 forming an actuating arm.

Upon said shaft 34 and within the last mentioned chamber and disposed adjacent each plate 16 is a pawl 32 in coplanar alignment with the adjacent ratchet 31. A tapered pin 36 in pawl hole 32a secures the pawl to the shaft and a tension spring 37 is connected at opposite ends to the plate 16 and the smaller end of pin 36.

Thus each pawl is normally constrained to ratchet engagement and prevents retrograde movement of same. Arm 35, when actuated, rocks the pawls to ratchet release position. The draft on the pawls is such that slight ratchet advance is required to permit the pawls to free themselves of the ratchet teeth.

Extending across the lowermost chamber is a pin 45 secured against axial displacement by cotter keys 46. A tongue 44 is disposed or projects into said chamber and the pin 45 extends through said tongue. Hence a tongue and slot type pivotal connection is provided between the tensioning and hook portions of the structure so that if the cable, chain or the like, associated with the pulley is generally directed angularly of the load carried by the hook, the aforesaid articulation is of self accommodating character thereby preventing breakage of the connection which would occur if the tension maintainer and hook were rigidly connected and not articulated.

The tongue 44 comprises an extension of the spacing member 43. Plates 48 are secured together with member 43 therebetween by the bolts and nuts 47. Member 43 includes biased face 43a. Disposed adjacent thereto and between plates 48 is an L-shaped member 49 having one end pivoted on pivot 47a and having its opposite end connected to pull device 50 such as a cord, ring or the like. L-member 49 serves as a release cam.

The two plates 48 having extensions are apertured at 55a and notched at 51. The latter form the socket of the hook having the mouth forming member 54 between the jaw portions 52 on said plates, the member 54 being secured therebetween as at 54a.

Another jaw member 56 having a laterally offset jaw portion 56a is adapted to engage portion 54 when the hook is closed and is pivoted in end portions 53 of said plates at apertures 55a by studs 55 on opposite sides of member 56.

Member 56 has arm extension 57 disposed between the plates and same is pivoted at the remote end to the adjacent ends of straddling links 58 at 57a. These links at their other ends are pivotally connected at 58a to the inner end of cam lever 59 pivoted at 60 between the plates and having outward extension 61.

This cam lever 61—59 is L-shaped and its free end has cam portion 62 engaged by release lever 49 at 49a when the hook is to be opened, see Fig. 1.

Disposed within socket 51, see Fig. 3, when the hook is open is projection 63 that is carried by arm 57 of jaw member 56. When this projection is load engaged the jaw member is tilted counterclockwise to tilt the linkage over center as it were and start the hook to closing. A spring 64 anchored at 64a bears at one end at 65 upon spacer 43 and at its other end upon lever 59. When the toggle is moved over center, as indicated, this spring continues the linkage movement to effect jaw closing, see Fig. 1. The hook device is self sustaining in both open and closed position.

Pulling on member 50 easily tilts cam lever 59—61 clockwise to effect over center movement of the linkage so that the jaw 56 moves to the position shown in Fig. 3 wherein the hook is open. To prevent accidental release the plates 43 have registering holes 48a in which is disposed detachable pin 66 secured by cotter keys 67. Thus the hook may be locked and held closed and prevented from opening until this lock pin is removed. This prevents accidental manual release, etc. for pin 66 prevents links 58 from moving from the position shown in Fig. 1 to that shown in Fig. 3, which is essential when the hook is to be opened.

Note the jaw 52—54 is stationary while jaw 56 is tiltable. The first is straight and the other L-shaped so that the load, such as a ring or loop, will readily slip out of the socket when the hook is released.

The invention claimed is:

1. A hook structure comprising in combination a housing including a stationary jaw and an L-shaped jaw pivotally supported in said housing, an L-shaped lever having one leg pivotally supported in said housing, a link having one end pivotally connected to the leg of said L-shaped jaw and the opposite end thereof pivotally connected to the free end of said pivoted leg of said lever, an operating arm pivotally supported in said housing having a cam portion operatively engageable with the other leg of said lever for effecting a locking movement of said lever to move said movable jaw into open position, and a spring mounted on said housing in operative engagement with the pivoted leg of said lever urging it to an over center locking position for maintaining said pivoted jaw in its closed position.

2. A hook structure comprising in combination, a housing including a stationary jaw and an L-shaped jaw pivotally supported in said housing, an L-shaped lever having one leg pivotally supported in said housing, a link having one end pivotally connected to the leg of said L-shaped jaw and the opposite end thereof pivotally connected to the free end of the pivoted leg of said jaw, the axis of the pivotal connection between said link and said L-shaped lever being offset from a line passing through the pivotal connection between the link and the jaw arm and the pivot of said lever, an operating arm pivotally supported in said housing having a cam portion operatively engageable with the other leg of said lever for effecting a locked movement of said lever to move said movable jaw into open position, and a spring mounted on said housing in operative engagement with the pivoted leg of said lever urging it to an over center locking position for maintaining said pivoted jaw in its closed position.

3. In a hook structure comprising a housing 48, 48 mounting a stationary jaw 52 and a movable jaw 56 pivoted (at 55) in said housing having a hooked end 56a extending toward said stationary jaw adapted to engage therewith when the hook is closed, the combination therewith of: an arm extension 57 upon said movable jaw integral therewith and disposed approximately transverse to the hooked end thereof, a lever arm 61 pivoted (at 60) on said housing in spaced relation to the jaw pivot 55, a link means 58 pivotally connected at its opposite end to the free end of said arm extension (at 57a) and the adjacent end of said lever arm (at 58a) respectively, said pivotal connections 57a, 58a of said link means being arcuately movable about the axis of the pivotal mounting 55 of said jaw and the axis of the pivotal mounting 60 of said lever arm respectively from hook open position (Fig. 3) with the pivotal connections 57a, 58a of said link means in substantial alignment with the pivotal mounting 55 of said movable jaw to hook closed position (Fig. 1) with the pivotal connection 57a, 58a of said link means in substantial alignment with the pivotal mounting 60 of said lever, and a spring 64 on said housing urging the pivotal connection 58a between said lever arm and link means to an over center locking position for maintaining said hook structure in its closed position.

4. In a hook structure comprising a housing 48, 48 mounting a stationary jaw 52 and a movable jaw 56 pivoted (at 55) in said housing having a hooked end 56a extending toward said stationary jaw adapted to engage therewith when the hook is closed, the combination therewith of: an arm extension 57 upon said movable jaw integral therewith and disposed approximately transverse to the hooked end thereof, a lever arm 61 pivoted (at 60) on said housing in spaced relation to the jaw pivot 55, a link means 58 pivotally connected at its opposite end to the free end of said arm extension (at 57a) and the adjacent end of said lever arm (at 58a) respectively, said pivotal connections 57a, 58a of said link means being arcuately movable about the axis of the pivotal mounting 55 of said jaw and the axis of the pivotal mounting 60 of said lever arm respectively from hook open position (Fig. 3) with the pivotal connections 57a, 58a of said link means in substantial alignment with the pivotal mounting 55 of said movable jaw to hook closed position (Fig. 1) with the pivotal connection 57a, 58a of said link means in substantial alignment with the pivotal mounting 60 of said lever, a spring 64 on said housing urging the pivotal connection 58a between said lever arm and link means to an over center locking position for maintaining said hook structure in its closed position, and a lateral projection on said movable jaw extending toward said stationary jaw disposed in the socket formed by said jaws and in the path of a load inserted therein to be engaged by said load for swinging the movable jaw from open position to closed position against the tension of said spring.

FREDRICK W. COFFING.

REFERENCES CITED

The following references are of record in the file of this patent:

UNITED STATES PATENTS

| Number | Name | Date |
| --- | --- | --- |
| 472,353 | Hilton | Apr. 5, 1892 |
| 1,041,068 | Greenbolgh | Oct. 15, 1912 |
| 1,807,038 | Holden | May 26, 1931 |
| 1,813,294 | Hunt | July 7, 1931 |
| 2,085,012 | Dixon | June 29, 1937 |
| 2,343,086 | Schultz | Feb. 29, 1944 |
| 2,350,999 | Beirise | June 13, 1944 |